(12) United States Patent
Nakane et al.

(10) Patent No.: US 8,266,755 B2
(45) Date of Patent: Sep. 18, 2012

(54) CLEANING DEVICE OF OPTICAL CONNECTOR

(75) Inventors: Junichi Nakane, Sakura (JP); Kunihiko Fujiwara, Sakura (JP)

(73) Assignee: Fujikura Ltd., Tokyo (JP)

( * ) Notice: Subject to any disclaimer, the term of this patent is extended or adjusted under 35 U.S.C. 154(b) by 435 days.

(21) Appl. No.: 12/695,891

(22) Filed: Jan. 28, 2010

(65) Prior Publication Data

US 2011/0072600 A1      Mar. 31, 2011

(30) Foreign Application Priority Data

Sep. 29, 2009   (JP) ................................. 2009-223594

(51) Int. Cl.
*B08B 11/00*   (2006.01)

(52) U.S. Cl. .................... 15/210.1; 15/97.1; 385/134

(58) Field of Classification Search .............. 15/97.1, 15/210.1; 385/134
See application file for complete search history.

(56) References Cited

U.S. PATENT DOCUMENTS

| | | | |
|---|---|---|---|
| 6,449,795 B1 * | 9/2002 | Sato | 15/210.1 |
| 6,758,605 B1 * | 7/2004 | Villemaire et al. | 385/85 |
| 7,212,719 B2 * | 5/2007 | Fujiwara et al. | 385/134 |
| 8,079,111 B2 * | 12/2011 | Fujiwara | 15/210.1 |
| 8,087,118 B2 * | 1/2012 | Fujiwara | 15/97.1 |
| 2002/0131748 A1 * | 9/2002 | Sato | 385/134 |
| 2006/0191091 A1 * | 8/2006 | Kida | 15/210.1 |
| 2007/0023067 A1 * | 2/2007 | Kida et al. | 134/6 |
| 2011/0047731 A1 * | 3/2011 | Sugita et al. | 15/97.1 |
| 2011/0154599 A1 * | 6/2011 | Nakane et al. | 15/210.1 |
| 2012/0017384 A1 * | 1/2012 | Fujiwara | 15/97.1 |
| 2012/0066849 A1 * | 3/2012 | Fujiwara | 15/97.1 |

FOREIGN PATENT DOCUMENTS

JP     2002-090576 A     3/2002

* cited by examiner

*Primary Examiner* — Robert Canfield
(74) *Attorney, Agent, or Firm* — Sughrue Mion, PLLC

(57) ABSTRACT

An optical connector cleaning device which cleans a connecting terminal surface formed inside an insertion hole of an optical connector, by wiping the connecting terminal surface with a cleaning body, the optical connector cleaning device including: a main body including a feeding mechanism which supplies and wraps up the cleaning body; an extending part which extends from the main body and includes an extending tube body and a head part, the head part being inserted into the insertion hole, wherein the head part includes a tip extending part which presses the cleaning body to the connecting terminal surface; the extending tube body includes a tube base part and a tip tube part, the tip tube part being energized in an extending direction with respect to the tube base part; the tip extending part protrudes from a tip of the tip tube part; and the tip extending part is flexible.

4 Claims, 20 Drawing Sheets

CLEANING DEVICE OF OPTICAL CONNECTOR

The present application claims priority on Japanese Patent Application No. 2009-223594, filed Sep. 29, 2009, the content of which is incorporated herein by reference.

BACKGROUND OF THE INVENTION

1. Field of the Invention

The present invention relates to a cleaning device of an optical connector, which cleans a connecting terminal surface of the optical connector by feeding and moving a cleaning body.

2. Description of the Related Art

When a connection of an optical connector is made, and a connecting terminal surface of the optical connector is dirty, or a foreign particle is attached to the connecting terminal surface, the optical connector might be damaged. In addition, an increase in the optical transmission loss might be triggered. Therefore, it is necessary to clean the connecting terminal surface before the optical connector is abutted and connected.

A known example of a cleaning device of an optical connector cleans the connecting terminal surface by contacting the connecting terminal surface with a cleaning body (see, for example, Japanese Unexamined Patent Application, First Publication No. 2002-90576 (hereinafter may be referred to as "Patent Document 1")).

An Outdoor Connector (registered trademark) is an optical connector structured so that a connecting terminal surface is provided in a back section inside a plurality of holes. The connecting terminal surface is the object to be cleaned (hereinafter may be referred to as a to-be-cleaned object). The connecting terminal surface of this type of an optical connector is cleaned by inserting a head part of a cleaning device into these holes.

However, when the head part is inserted into the holes of the optical connector, or when the head part is pulled out from the holes, an unreasonable amount of force might be applied to the head part. In this way, there is a possibility that the head part will be broken.

Considering the problems described above, an object of the present invention is to provide a cleaning device of an optical connector which prevents the head part from breaking.

SUMMARY OF THE INVENTION

In order to attain the above objects, the present invention provides the following configurations:

An optical connector cleaning device according to an aspect of the present invention cleans a connecting terminal surface formed inside an insertion hole of an optical connector, by wiping the connecting terminal surface with a cleaning body. The optical connector cleaning device includes: a main body including a feeding mechanism which supplies and wraps up the cleaning body; an extending part which extends from the main body and includes an extending tube body and a head part, the head part being inserted into the insertion hole, wherein the head part includes a tip extending part which presses the cleaning body to the connecting terminal surface; the extending tube body includes a tube base part and a tip tube part, the tip tube part being energized in an extending direction with respect to the tube base part due to an urging member; the tip extending part protrudes from a tip of the tip tube part, and a protruding length of the tip extending part is adjusted by the tip tube part moving with respect to the tube base part towards the extending direction and towards a direction opposite to the extending direction; and the tip extending part is flexible.

In addition, the above cleaning device of the optical connector may be configured as follows: the head part includes polyoxymethylene.

In addition, the above cleaning device of the optical connector may be configured as follows: the head part protrudes from the tip of the tip tube part in a normal state.

According to the cleaning device of the optical connector based on the present invention, the tip extending part of the head part is flexible, and can be bent and deformed elastically. As a result, when the tip extending part is inserted in or pulled out from the insertion hole of the optical connector, and a force in the bending direction is applied to the tip extending part due to a movement or position of the optical connector, the tip extending part can be prevented from breaking.

DETAILED DESCRIPTION OF THE PREFERRED EMBODIMENTS

Hereinafter, an embodiment of a cleaning device of an optical connector (hereinafter, may be simply referred to as a "cleaning device") according to the present invention is described with reference to the figures.

First, an optical connector 60 is described. The optical connector 60 is cleaned using a cleaning device 1.

Figure 26:
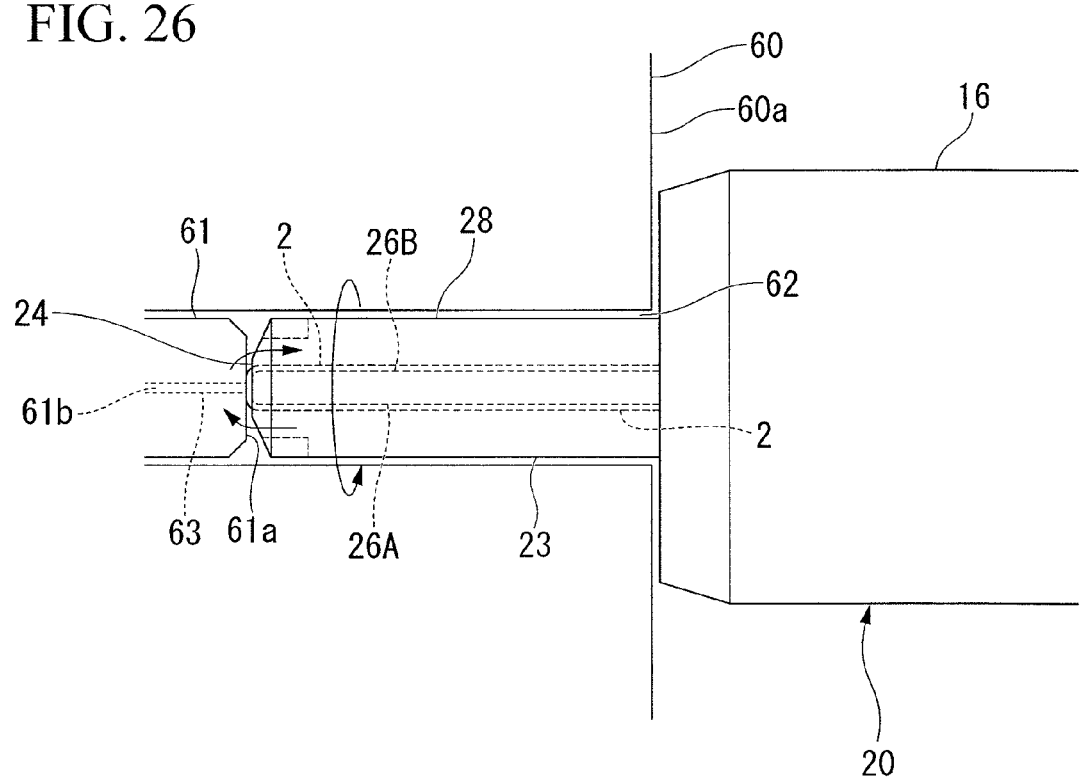
FIG. 26 is a descriptive view representing a movement of a head part according to the above embodiment.

As shown in FIG. 26, the optical connector 60 is structured so that a ferrule 61 (optical ferrule) is provided on a back portion inside a plurality of insertion holes 62.

An optical fiber hole 61b (a pore) is provided in a center portion of a connecting terminal surface 61a of the ferrule 61. An optical fiber 63 is inserted in the optical fiber hole 61b. A tip of this optical fiber 63 is exposed on the connecting terminal surface 61a.

The optical fiber 63 is, for example, an optical fiber bare wire obtained by removing a resin covering a tip portion of an optical fiber core wire. A terminal of the optical fiber 63 is formed so that the terminal can be abutted and connected to another optical connector.

Next, a structure of the cleaning device 1 is described.

Figure 1:
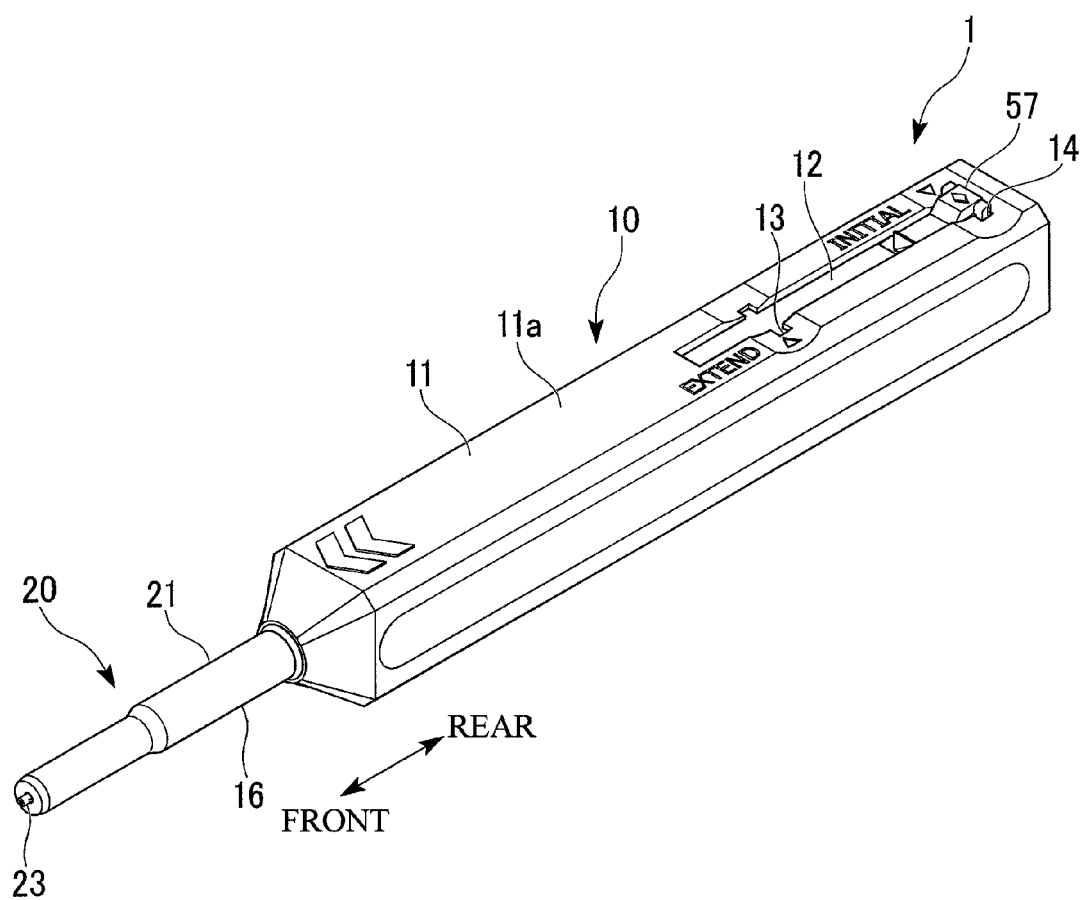
FIG. 1 is a perspective view of a cleaning device of an optical connector according to an aspect of the present invention.
Figure 2:
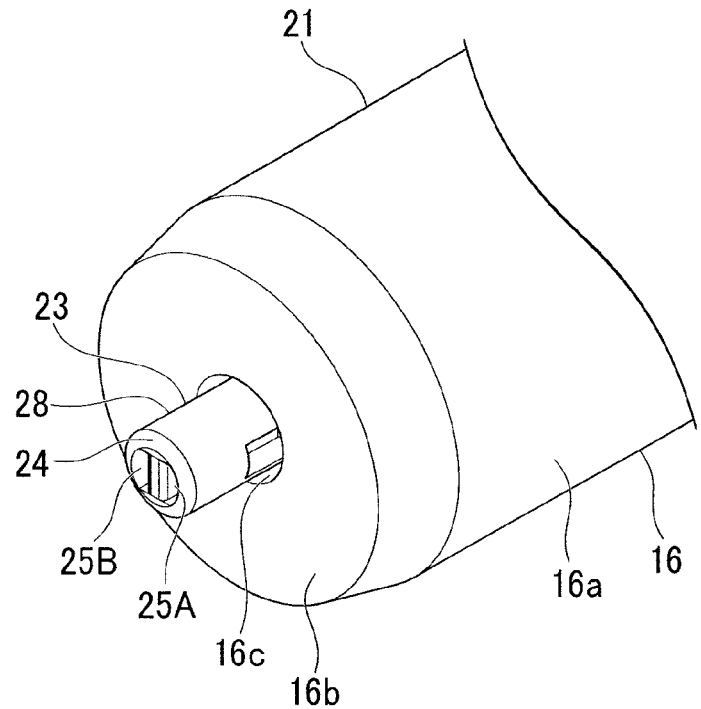
FIG. 2 is a perspective view providing an enlarged view of a relevant component of a cleaning device according to the above embodiment.
Figure 3:
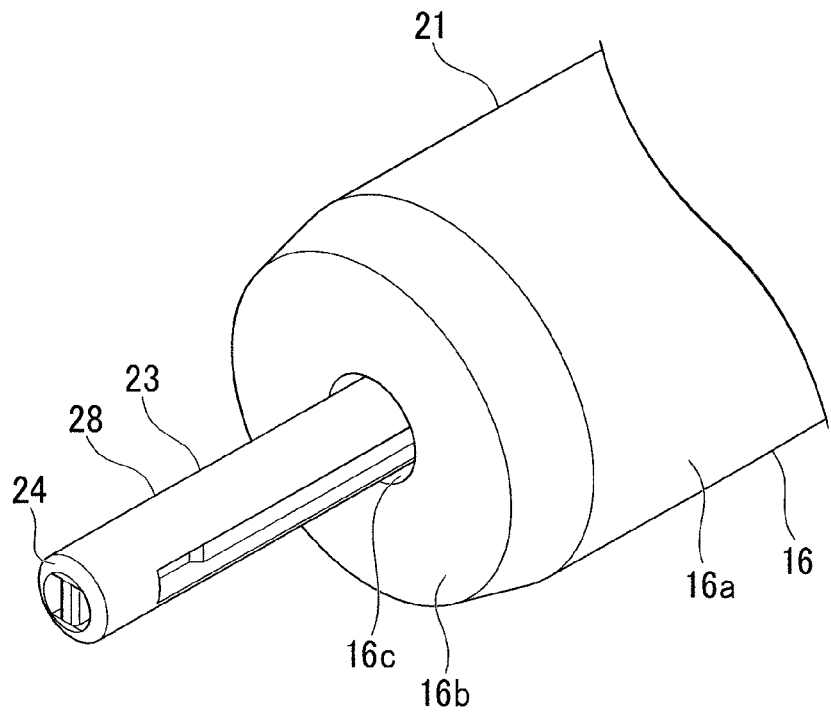
FIG. 3 is a perspective view providing an enlarged view of a relevant component of a cleaning device according to the above embodiment.
Figure 4:
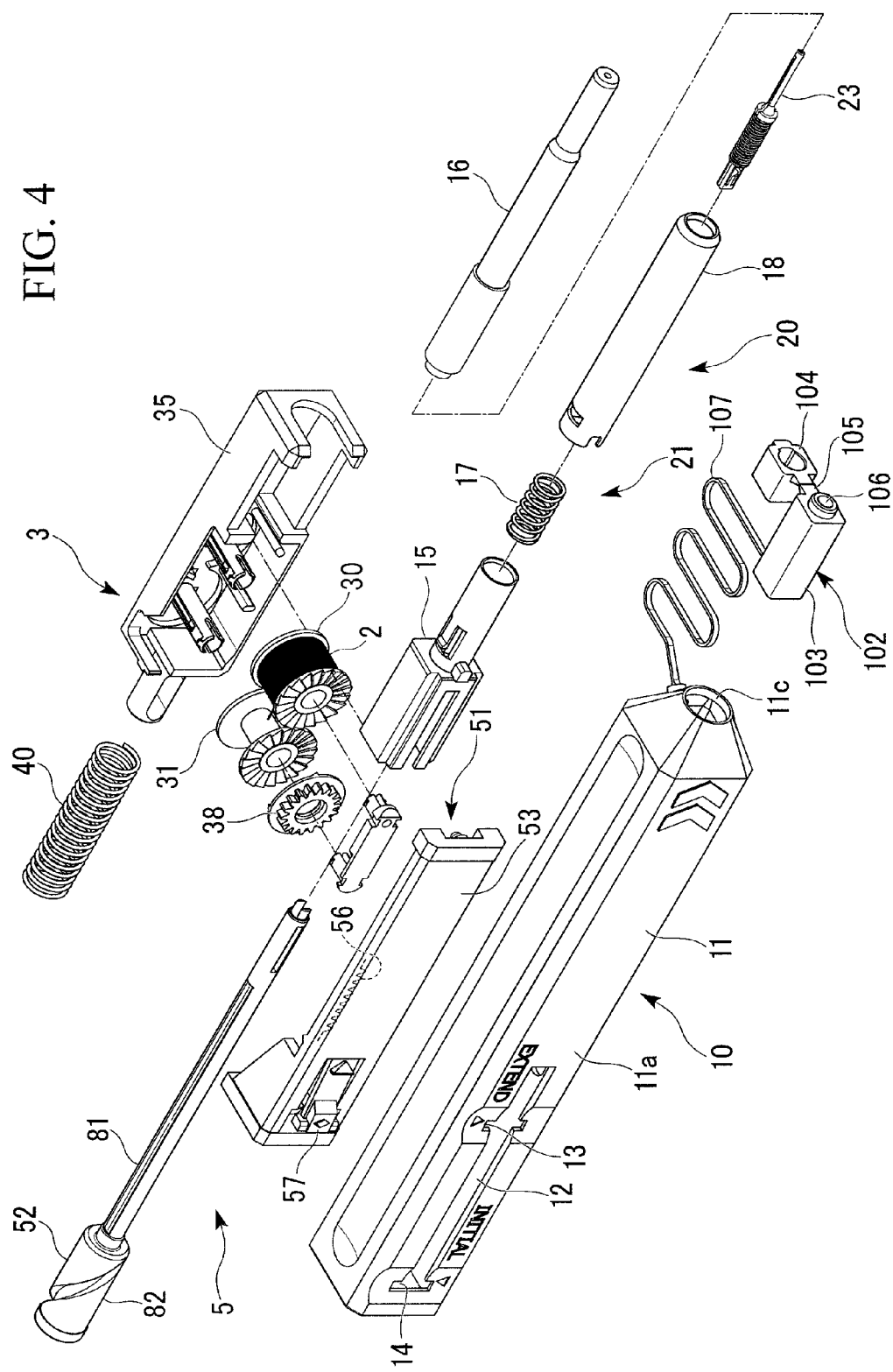
FIG. 4 is an exploded perspective view of a cleaning device according to the above embodiment.
Figure 5:
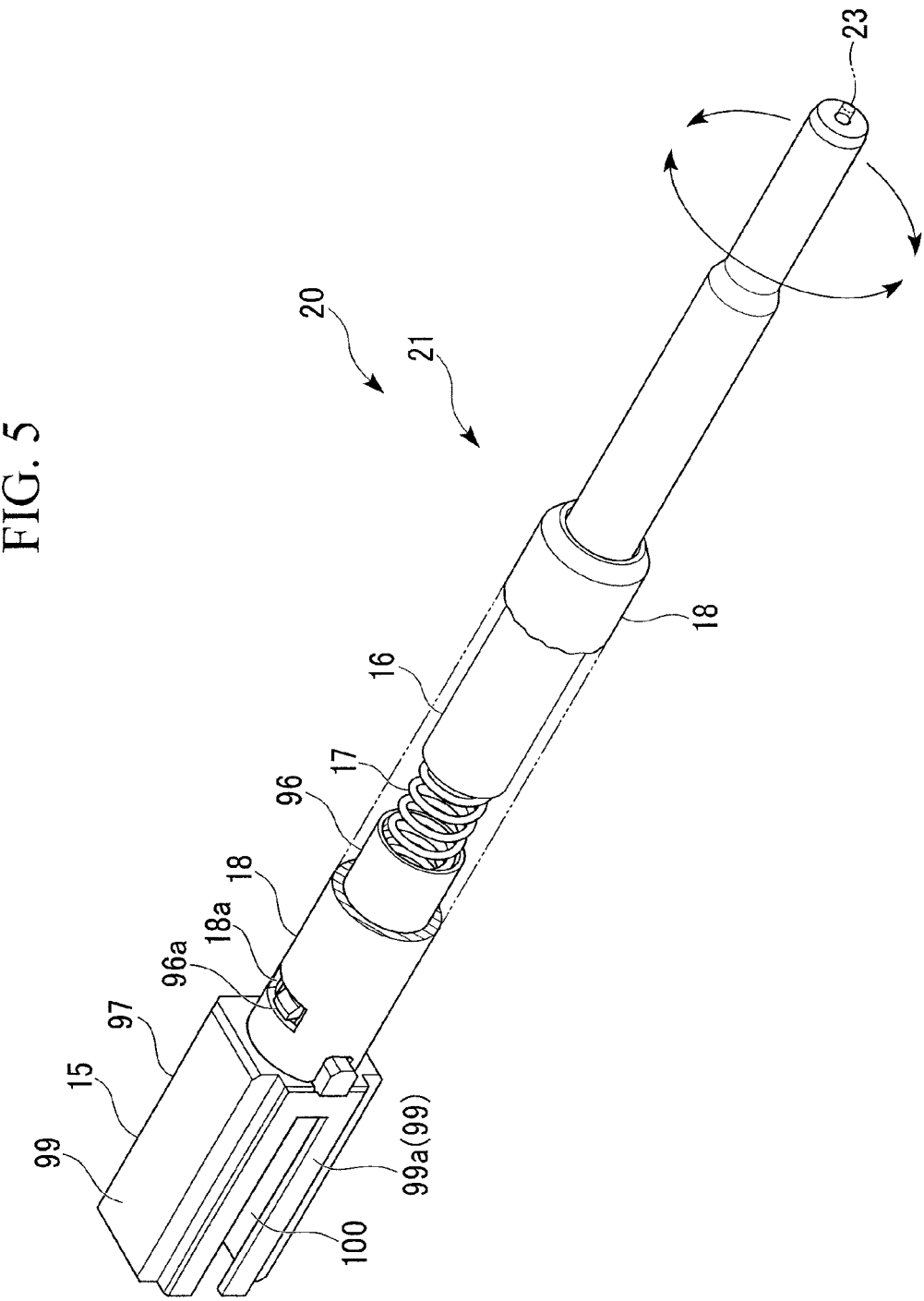
FIG. 5 is a perspective view representing an extending tube body according to the above embodiment.
Figure 6:
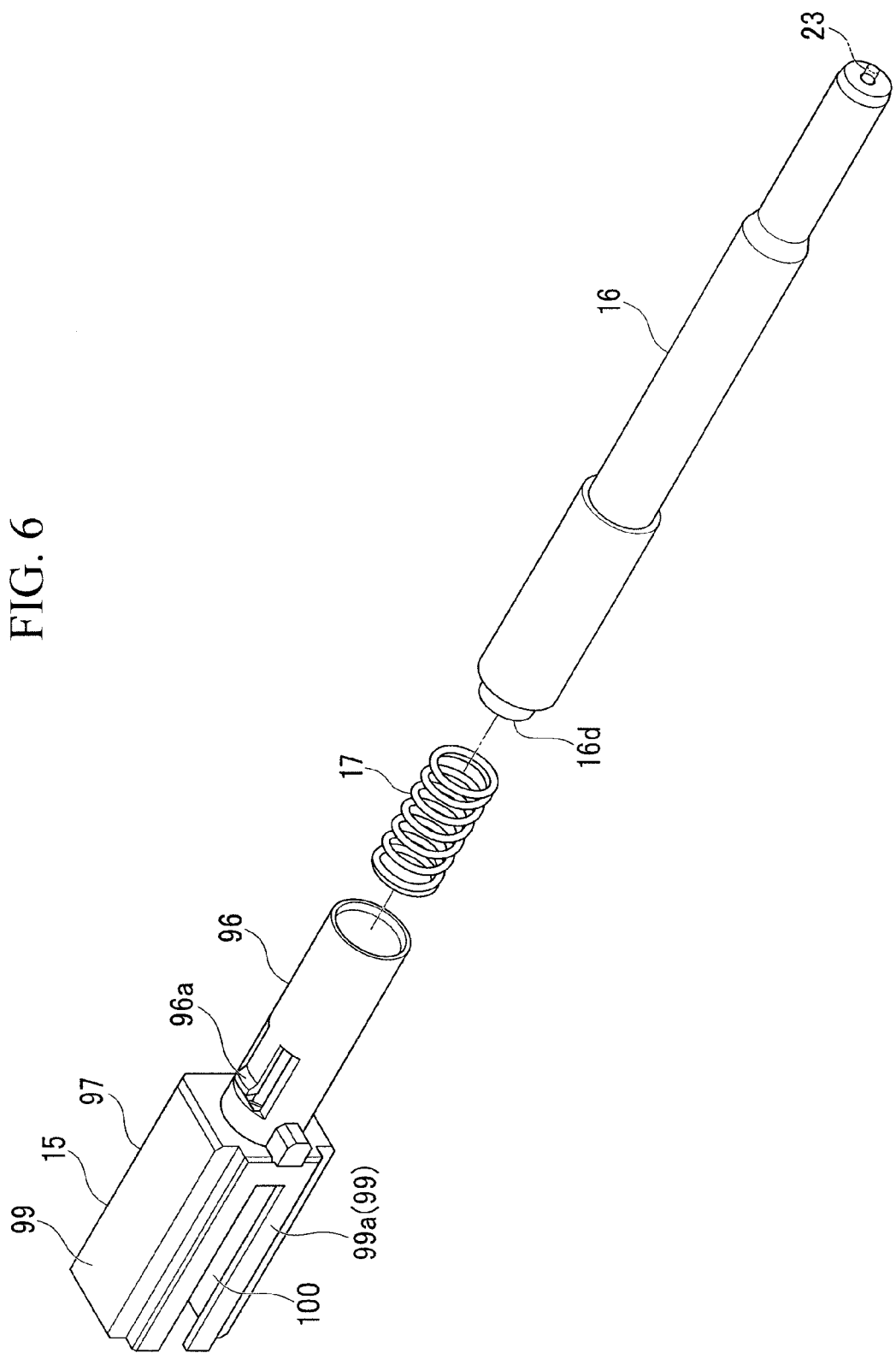
FIG. 6 is an exploded perspective view representing an extending tube body according to the above embodiment.
Figure 7:
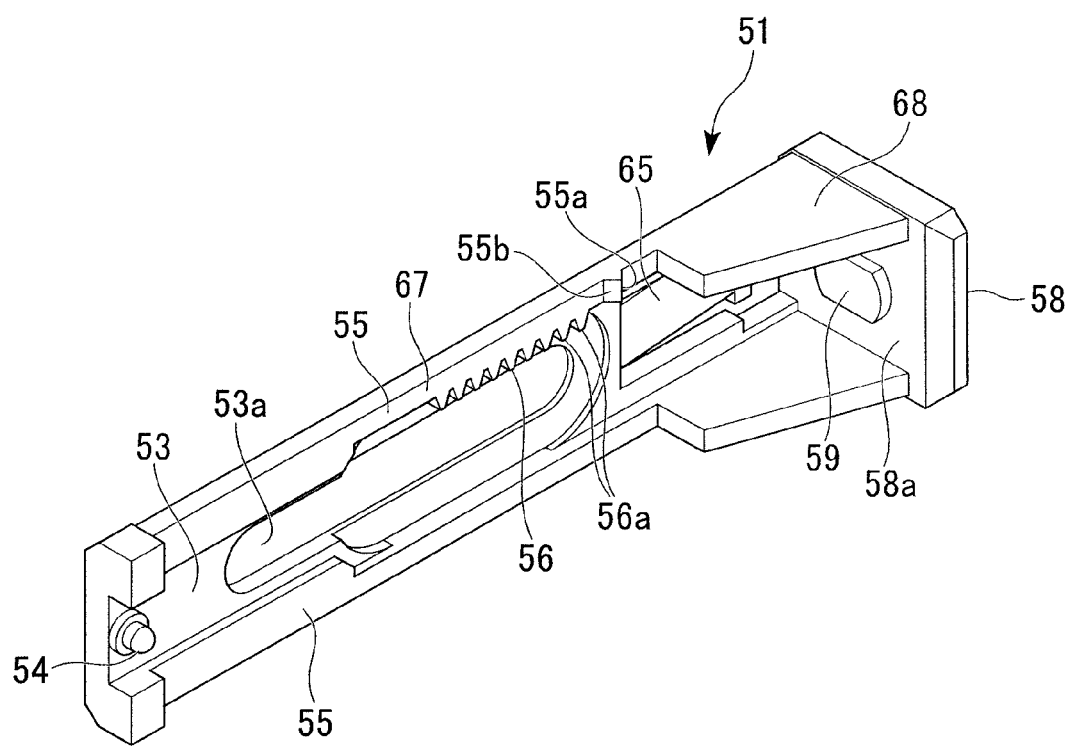
FIG. 7 is a perspective view representing a supporting body according to the above embodiment.
Figure 8:
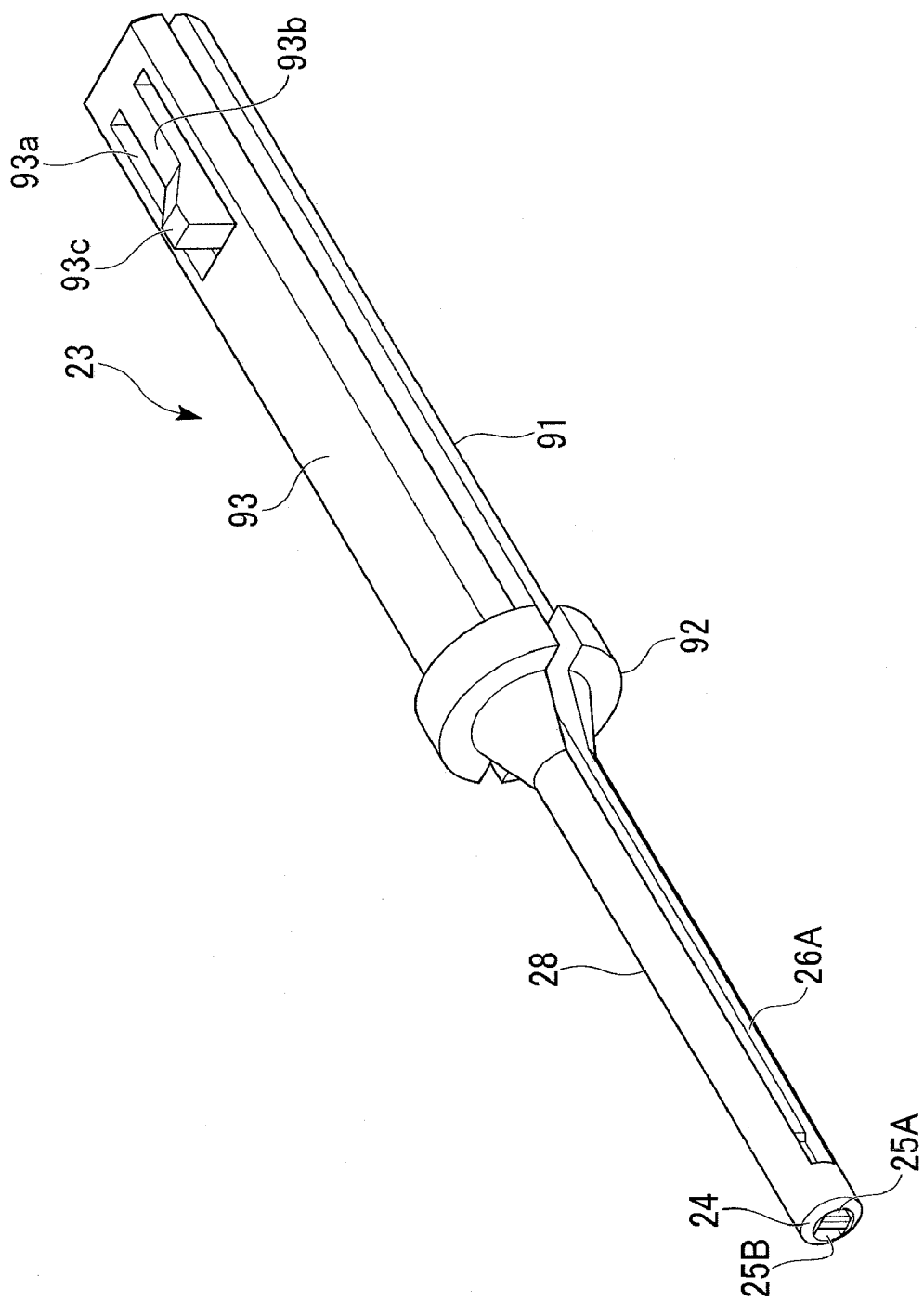
FIG. 8 is a perspective view representing a head part according to the above embodiment.
Figure 9:
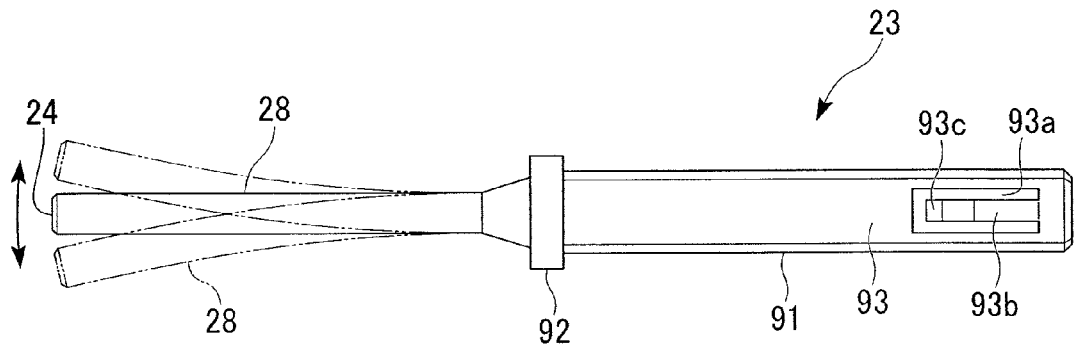
FIG. 9 is a plane view representing a head part according to the above embodiment.
Figure 10:
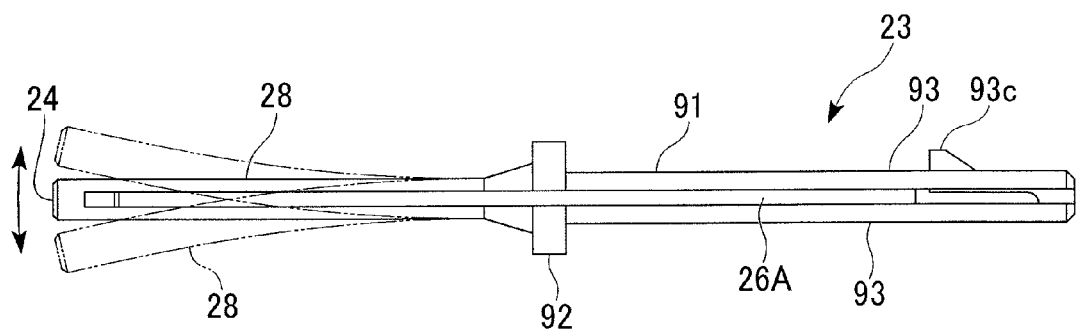
FIG. 10 is a side view representing a head part according to the above embodiment.
Figure 11:
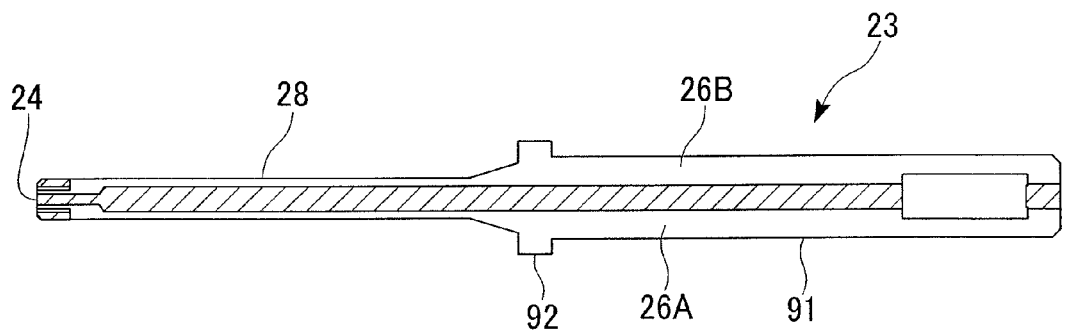
FIG. 11 is a cross-sectional diagram representing a head part according to the above embodiment.
Figure 12:
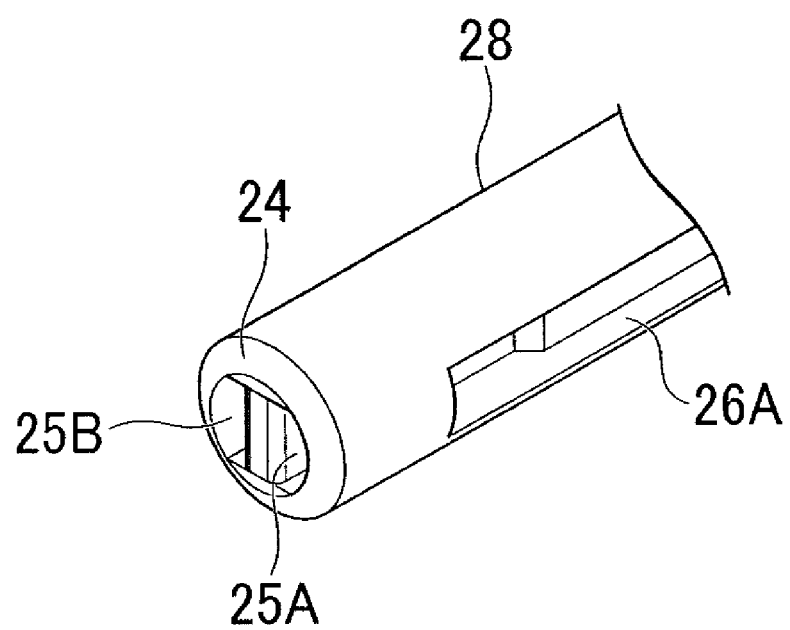
FIG. 12 is a perspective view representing a tip portion of a head according to the above embodiment.
Figure 13:
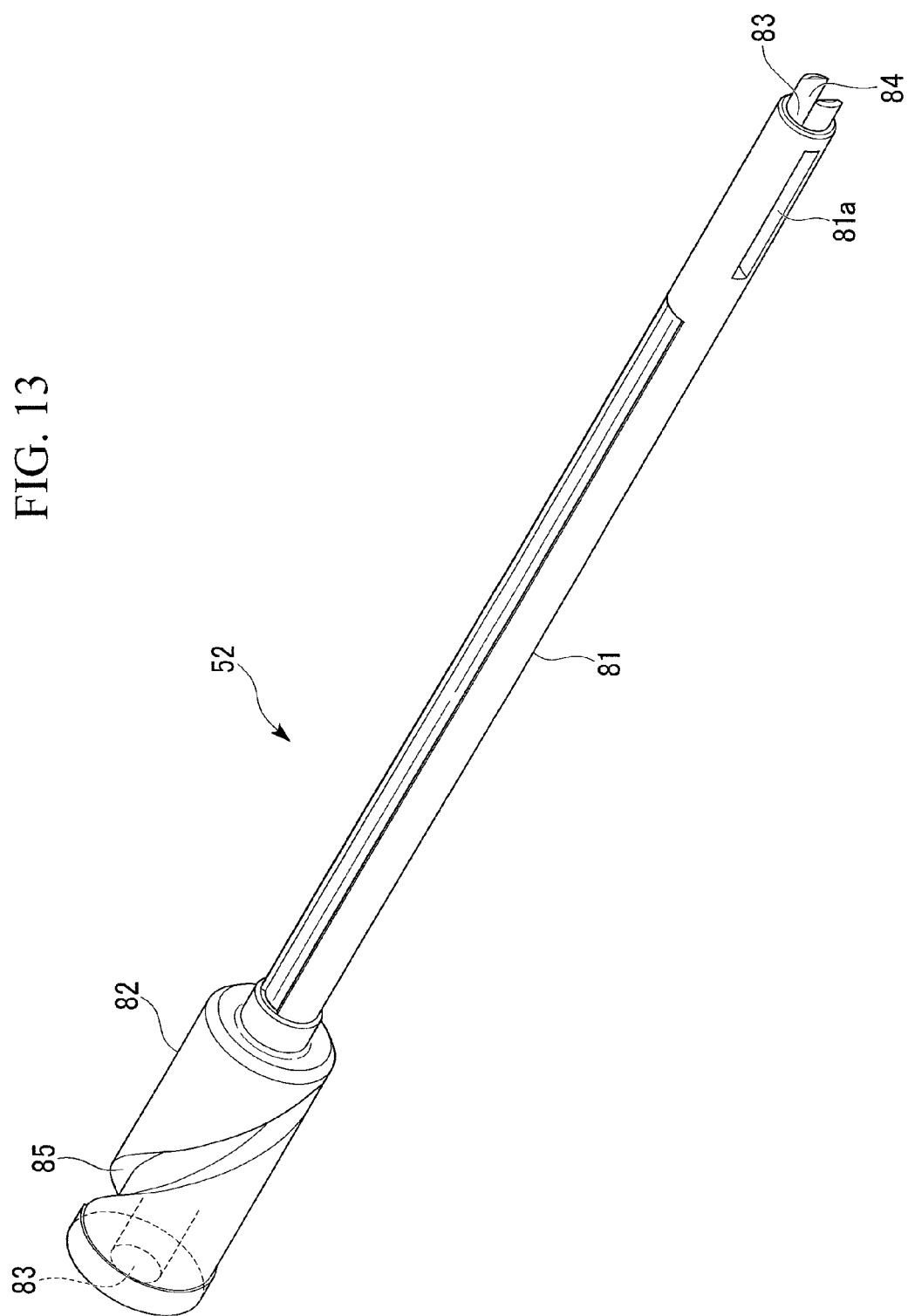
FIG. 13 is a perspective view representing a rotational shaft of a rotational mechanism according to the above embodiment.
Figure 14:
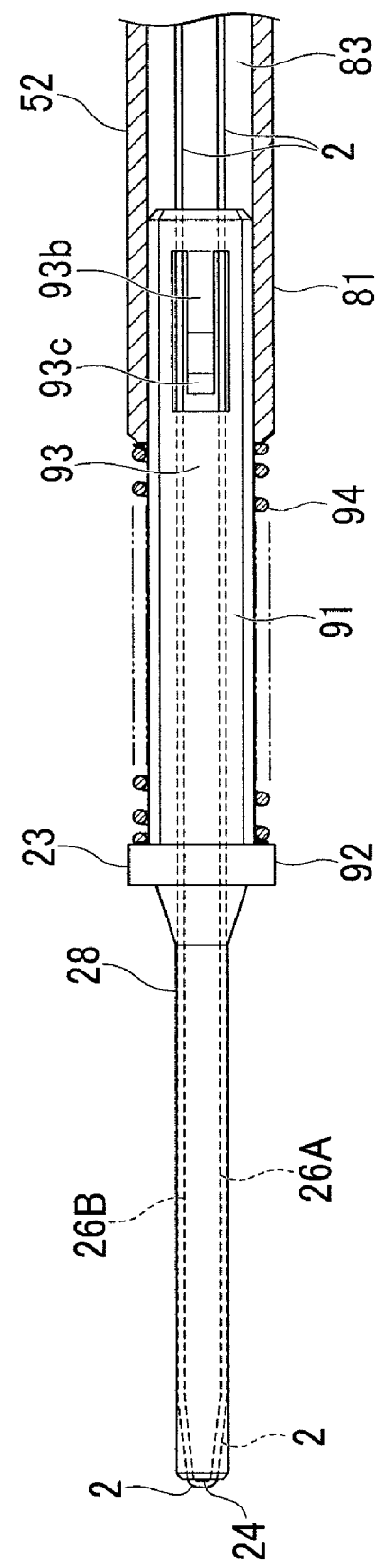
FIG. 14 is a plane view of a rotational shaft and a head part attached to a tip of the rotational shaft according to the above embodiment. A part of the diagram is drawn in a cross-sectional view.
Figure 15:
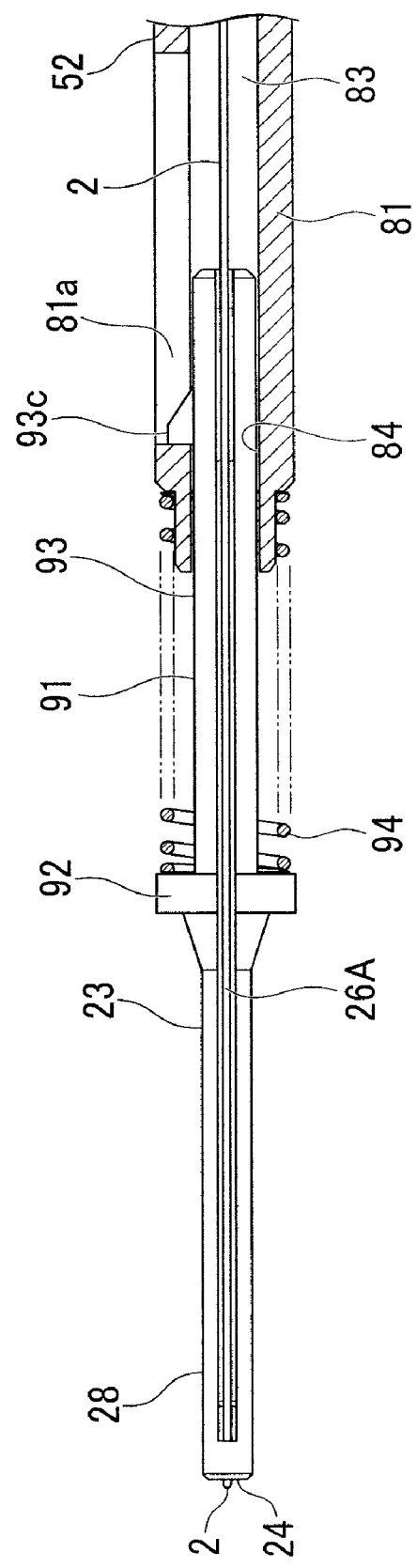
FIG. 15 is a side view of a rotational shaft and a head part attached to a tip of the rotational shaft according to the above embodiment. A part of the diagram is drawn in a cross-sectional view.
Figure 16:
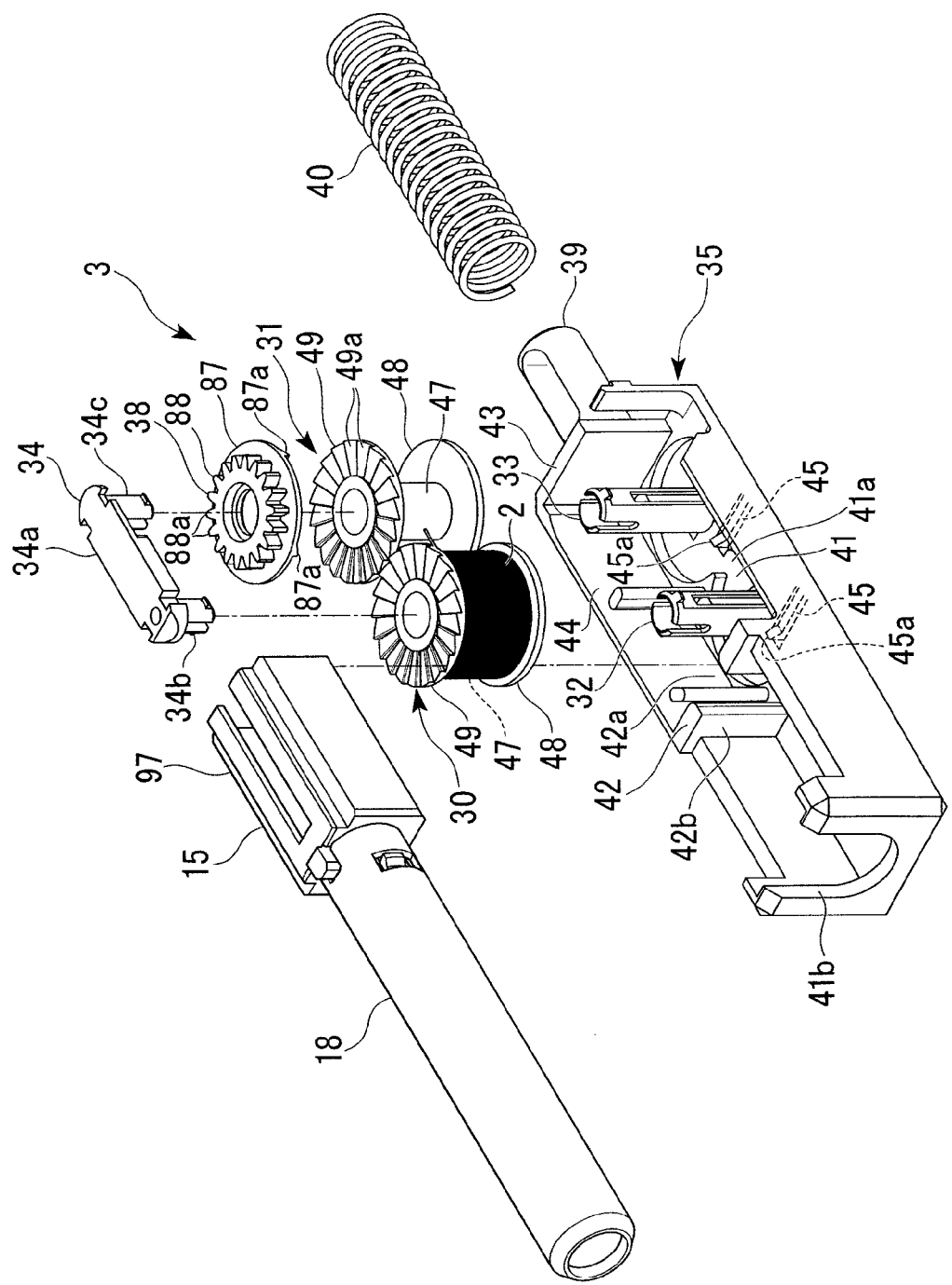
FIG. 16 is an exploded perspective view representing a feeding mechanism according to the above embodiment.

FIG. 1 is a perspective view of the cleaning device 1 of an optical connector according to the present embodiment. FIGS. 2 and 3 are perspective views providing an enlarged view of a relevant component of a cleaning device 1. FIG. 4 is an exploded perspective view of the cleaning device 1. FIG. 5 is a perspective view representing an extending tube body 21. FIG. 6 is an exploded perspective view representing the extending tube body 21. FIG. 7 is a perspective view representing the supporting body 51. FIG. 8 is a perspective view representing a head part 23. FIG. 9 is a plane view representing the head part 23. FIG. 10 is a side view representing the head part 23. FIG. 11 is a cross-sectional diagram representing the head part 23. FIG. 12 is a perspective view representing a tip portion of the head part 23. FIG. 13 is a perspective view representing a rotational shaft 52 of a rotational mechanism 5. FIG. 14 is a plane view of the rotational shaft 52 and the head part 23 attached to a tip of the rotational shaft 52. A part of FIG. 14 is drawn in a cross-sectional view. FIG. 15 is a side view of the rotational shaft 52 and the head part 23 attached to a tip of the rotational shaft 52. A part of FIG. 15 is drawn in a cross-sectional view. FIG. 16 is an exploded perspective view representing the feeding mechanism 3.

As shown in FIG. 1, the cleaning device 1 includes a main body 10 and an extending part 20. In the following description, a "frontal direction" refers to the direction of the tip of the extending part 20 shown in FIG. 1 (an extending direction). A "rear direction" is referred to as the direction opposite to the frontal direction.

As shown in FIGS. 1 and 4, the main body 10 of the cleaning device is structured so that a feeding mechanism 3 and a rotational mechanism 5 are provided inside a case body 11. The feeding mechanism 3 supplies a cleaning body 2 and rolls up the cleaning body 2. The rotational mechanism 5 rotates the head part 23.

The case body 11 is formed as a tube. The cross-section of the case body 11 is approximately shaped as a rectangle. The case body 11 includes four side wall parts 11a. A positioning opening part 12 is formed in the rear portion of one of the side wall parts 11a. A positioning convex part 57 is inserted in the positioning opening part 12.

The positioning opening part 12 is formed as a slit along the front-rear direction. In the margins of the front and back portions of the positioning opening part 12, a first fitting concave part 13 and a second fitting concave part 14 are formed. The positioning convex part 57 fits in the first fitting concave part 13 and the second fitting concave part 14.

In the front end of the case body 11, an insertion opening 11c is formed. The extending part 20 is inserted in the insertion opening 11c.

As shown in FIG. 4, the rotational mechanism 5 includes a supporting body 51 and a rotational shaft 52. The supporting body 51 is positioned with respect to the case body 11. The rotational shaft can rotate around the axis.

As shown in FIG. 7, the supporting body 51 includes a substrate 53, an insertion protrusion part 54, a side plate 55, and a rear end plate 58. The substrate 53 is rectangular and is placed along the front-rear direction. The insertion protrusion part 54 is formed so as to protrude from the inner surface 53a of the front end part of the substrate 53. The side plate 55 is formed so as to protrude from the margins in both sides of the substrate 53 towards the side of the inner surface 53a. The rear end plate 58 is formed so as to extend from the rear end side of the substrate 53 towards the side of the inner surface 53a.

A gear receiving part 56 is formed on one of the side plates 55. The gear receiving part 56 is shaped like a sawtooth. The gear receiving part 56 includes a plurality of receiving tooth parts 56a. The receiving tooth part 56a protrudes from one of the side plates 55 towards the other side plate 55. The receiving tooth part 56a is aligned in the longitudinal direction (front-rear direction) of the supporting body 51.

The retention convex part 59 is formed in the front surface 58a of the rear end plane 58.

The insertion convex part 54 is shaped approximately as a cylinder. The protrusion height of the insertion convex part 54 and the outer diameter of the insertion convex part 54 are determined so that the insertion convex part 54 can fit the cam groove 85 of the rotational tube part 82.

A plate-like resilient piece 65 is formed in a rear portion of the substrate 53. A positioning convex part 57 is formed on the upper surface (outer surface) of the rear end part of the resilient piece 65. The positioning convex part 57 protrudes in the upper direction (outer direction). See FIG. 4.

As shown in FIGS. 4 and 13-15, the rotational shaft 52 includes a rotational tube part 82 and a guiding tube part 81. The guiding tube part 81 extends from a front end of the rotational tube part 82 towards the front.

An insertion hole 83 is formed inside the rotational shaft 52 from a front end of the guiding tube part 81 to a rear end of the rotational tube part 82.

The guiding tube part 81 is shaped approximately as a cylinder. An insertion part 91 of the head part 23 can be inserted in the insertion hole 83 at a front end part of this guiding tube part 81. A rotational stopping part 84 is formed on the inner side of the front end part of the guiding tube part 81. The inner surface of the rotational stopping part 84 is formed to be flat.

As shown in FIG. 13, the rotational tube part 82 is formed approximately as a cylinder. The cam groove 85 is formed on the outer surface of the rotational tube part 82. The insertion convex part 54 of the supporting body 51 is inserted in the cam groove 85.

At least a part of the cam groove 85 is formed in a slanted manner with respect to the axial direction of the rotational tube part 82 in the front-back direction. Therefore, as described later, when the rotational shaft 52 shifts in the front-back direction, the rotational tube part 82 moves along the cam groove 85. As a result, the rotational shaft 52 rotates around the axis. In the diagrammed example, the cam groove 85 is formed in a spiral form.

As shown in FIGS. 8 to 12, the head part 23 includes an insertion part 91, a flange part 92, and a tip extending part 28. The insertion part 91 can be inserted in the insertion hole 83 of the guiding tube part 81. The flange part 92 is formed in the front end of the insertion part 91. The tip extending part 28 is approximately cylindrical, and extends from the front surface of the flange part 92 towards the frontal direction.

The tip surface of the tip extension part 28 becomes a pressing surface 24 which presses the cleaning body 2 against the connecting terminal surface 61a.

As shown in FIGS. 9 and 10, the tip extending part 28 is flexible, and can be bent and deformed resiliently. There is no limitation on the direction in which the tip extending part 28 is bent. It is preferred that the tip extending part 28 can bend in all directions.

Figure 24:
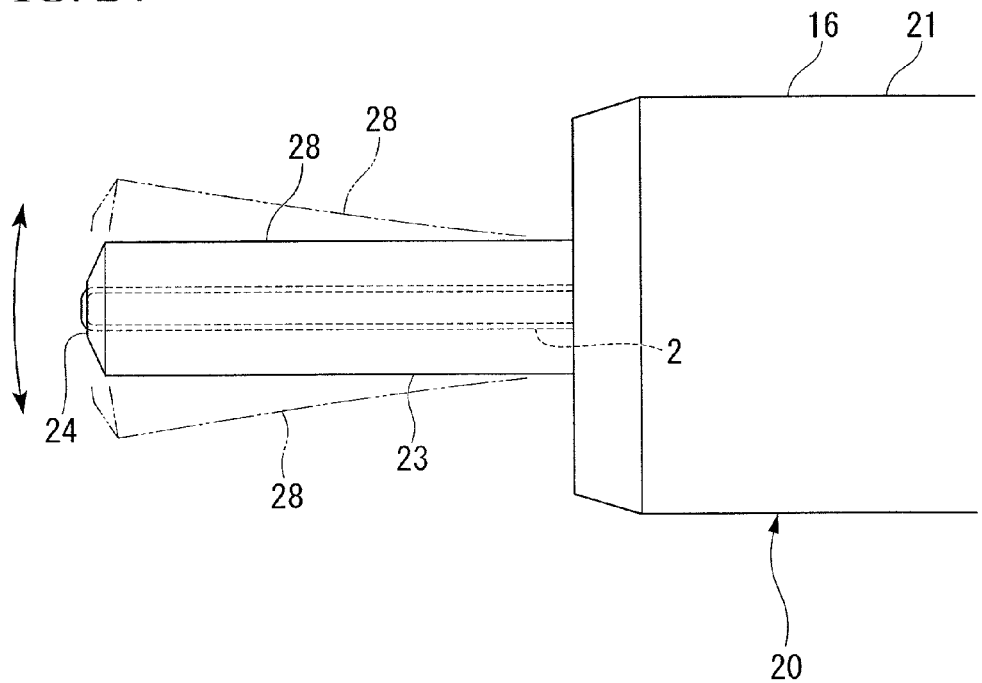
FIG. 24 is a descriptive view representing a movement of a head part according to the above embodiment.

Thus, as shown in FIG. 24, a protruding portion of the tip extending part 28 sticking out from the tip tube part 16 at the time of assembly can be bent and deformed in various directions.

The outer diameter of the tip extending part 28 is set so that the tip extending part 28 can be inserted in the insertion hole 62 of the optical connector 60. For example, the outer diameter may be set to 1.0 mm-1.44 mm.

The length of the tip extending part 28 is set so that the cleaning body 2 on the pressing surface 24 can reach the connecting terminal surface 61a when the tip extending part 28 is inserted into the insertion hole 62. For example, the length of the tip extending part 28 may be greater than or equal to 10 mm.

A guide opening part 25A, 25B (a guiding part) is formed on the pressing surface 24. The guide opening part is an opening through which the cleaning body 2 is inserted.

One of the guide opening parts 25A leads the cleaning body 2, supplied by the feeding mechanism 3, to the pressing surface 24. The other guide opening part 25B leads the cleaning body 2, which has already moved across the pressing surface 24, to the feeding mechanism 3. Because the guide opening parts 25A and 25B are formed, the cleaning body 2 is prevented from sliding off of the pressing surface 24.

It is preferred that a guiding groove 26A, 26B be formed on a side surface of the tip extending part 28. The guiding groove guides the movement of the cleaning body 2. The guiding grooves 26A and 26B are also formed on a side surface of the flange part 92 and the insertion part 91.

A flat part 93 is formed on the insertion part 91. The flat part 93 is shaped according to the rotational stopping part 84 formed on the guiding tube part 81. Since the flat part 93 is placed along the rotational stopping part 84, the head part 23 does not rotate with respect to the guiding tube part 81. In the diagramed example, the flat part 93 is formed on both sides of the surface of the insertion part 91.

An opening part 93a is formed on the rear part of one of the flat parts 93 of the insertion part 91. An elastic piece 93b is formed on the rear edge of the opening part 93a. The elastic piece 93b extends forward. An engagement click 93c is formed on the tip of the elastic piece 93b. The engaging click 93c sticks out from the flat part 93.

As shown in FIG. 15, the engaging click 93c can engage with the front edge of the engaging opening part 81a (engaging concave part) formed on the guiding tube part 81. Since the engaging click 93c engages with the front edge of the engaging opening part 81a, the longitudinal movement of the head part 23 is restricted. In this way, the head part 23 is prevented from falling off.

As shown in FIG. 2, the head part 23 is formed so that the tip portion of the tip extending part 28 can be inserted in the insertion opening part 16c of the tip wall part 16b of the tip tube part 16. In a normal state, it is preferred that the tip extending part 28 including the tip portion protrude from the tip wall part 16b.

The head part 23 can be configured as an integrated product including synthetic resin such as polyoxymethylene (POM, polyacetal) and polypropylene.

In particular, since polyoxymethylene is superior in toughness, the durability of the tip extending part 28 can be enhanced by using polyoxymethylene.

As shown in FIGS. 14-16, a cleaning body 2 is wrapped around the head part 23. The cleaning body 2 is pulled out from a supplying reel 30.

In the diagrammed example, the cleaning body 2 is led from the supplying reel 30 inside the main body 10, passes through the interior of the insertion hole 83 of the rotational shaft 52, passes through the guiding groove 26A and the guide opening part 25A of the head part 23, reaches the pressing surface 24, passes through the guide opening part 25B and the guiding groove 26B, and reaches the wrapping-up reel 31.

There is no limitation on the configuration and material of the cleaning body 2. A known and appropriate cleaning cloth (woven fabric or unwoven fabric) may be transformed into a string (or a cord) or a tape, and may be used as a cleaning body 2. For example, a material made of extra fine fiber such as polyester and nylon may be used.

Reference numeral 94 in FIGS. 14 and 15 indicates an urging member (such as a coil spring) provided between the front end of the guiding tube part 81 and the flange part 92. The urging member 94 energizes the head part 23 in the forward direction when the head part 23 is pressed against the connecting terminal surface 61a.

As shown in FIG. 16, the feeding mechanism 3 includes a supplying reel 30, a wrapping-up reel 31, a supporting part 35, a gear 38, a retaining tube part 39, an urging member 40, and a pressing part 34. The cleaning body 2 is wrapped around the supplying reel 30. The wrapping-up reel 31 wraps up and retrieves the used cleaning body 2. The supplying reel 30 and the wrapping-up reel 31 are attached to the supporting part 35 so that the supplying reel 30 and the wrapping-up reel 31 can rotate. The gear 38 is attached to the wrapping-up reel 31. The retaining tube part 39 is formed on the supporting part 35. The urging member 40 such as a coil spring is attached to the retaining tube part 39.

The supporting part 35 includes a substrate 41, a supplying reel supporting axis 32, a wrapping-up reel supporting axis 33, a partition plate 42, a rear end plate 43, and a side plate 44. The supplying reel supporting axis 32 is provided on the inner surface 41a of the substrate 41. The supplying reel 30 is rotatably attached to the supplying reel supporting axis 32. The wrapping-up reel 31 is rotatably attached to the wrapping-up reel supporting axis 33. The partition plate 42 is formed in an intermediate portion of the substrate 41 in the longitudinal direction. The rear end plate 43 is formed in the rear end portion of the substrate 41. The side plate 44 is formed in the side edge portion of the substrate 41.

Two extension plates 45, 45 are formed on the substrate 41. The extension plates 45, 45, extend in a direction perpendicular to the radial direction of the reel 30, 31. Engaging clicks 45*a*, 45*a* are formed on the tip portion of these extension plates 45, 45. The engaging clicks 45*a*, 45*a* stick out, respectively, towards the reels 30, 31. The extension plate 45 can be elastically bent and deformed. Thus, the extension plate 45 is flexible. The engaging click 45*a* can move in a direction approaching and moving away from the reels 30, 31.

A notch 41*b* is formed on the front end of the substrate 41. The tip tube part 16 and the outer tube body 18 fit in the notch 41*b*.

The pressing part 34 prevents the reels 30, 31 and the gear 38 from falling off. The fitting parts 34*b*, 34*c* are formed on the front end and the rear end of the main body part 34*a*. The main body part 34 is shaped as a rectangular plate, and extends in the longitudinal direction of the pressing part 34. The reel supporting axes 32, 33 can fit with the fitting parts 34*b*, 34*c*.

A passing-through concave part 42*a* is formed on the partition plate 42. The cleaning body 2 passes through the passing-through concave part 42*a*.

The supplying reel 30 and the wrapping-up reel 31 include a reel body part 47, a first end plate 48, and a second end plate 49. The cleaning body 2 is wrapped around the reel body part 47. The first end plate 48 is provided on one end of the reel body part 47. The second end plate 49 is provided on the other end of the reel body part 47.

A plurality of engaging concave parts (not diagrammed) are formed on the outer surface of the first end plate 48. These engaging concave parts are aligned in the peripheral direction. Since the engaging click 45*a* of the extension plate 45 engages with the engaging concave part, the reels 30, 31 are prevented from rotating in the opposite direction. A plurality of engaging convex parts 49*a* are formed on the outer surface of the second end plate 49. These engaging convex parts are aligned in the peripheral direction.

The reels 30, 31 are attached to the supporting part 35 by inserting the supporting axes 32, 33 through the body part 47.

The gear 38 includes a circular substrate 87 and a gear wheel part 88. The circular substrate 87 is shaped like a circular plate. The gear wheel part 88 is formed on one surface of the circular substrate 87. An engaging protrusion 87*a* is formed on the other side of the circular substrate 87. The engaging protrusion 87*a* engages with the engaging convex part 49*a* of the wrapping-up reel 31.

The gear wheel part 88 includes a plurality of tooth parts 88*a* which is aligned in the peripheral direction. These tooth parts 88*a* are formed so as to interlock with the receiving tooth part 56*a* of the gear receiving part 56 of the supporting body 51.

The gear 38 is placed on the second end plate 49 of the wrapping-up reel 31. The engaging protrusion 87*a* of the circular substrate 87 engages with the engaging convex part 49*a* of the second end plate 49. As a result, the wrapping-up reel 31 rotates according to the rotation of the gear 38.

When the gear 38 rotates in a direction opposite to the direction in which the cleaning body 2 is wrapped up, the engaging protrusion 87*a* is formed so as not to engage with the engaging convex part 49*a*.

As shown in FIGS. 4 to 6, the extension part 20 includes an extension tube body 21 and a head part 23. The head part 23 is inserted in the extension tube body 21.

The extension tube body 21 includes a tube base part 15, a tip tube part 16, a tube urging member 17, and an outer tube body 18. The tip tube part 16 is provided in the tip side of the tube base part 15. The tube urging member 17 energizes the tip tube part 16 in the frontal direction.

The tube base part 15 includes a retaining frame part 97 and a cylindrical connection tube part 96. The connection tube part 96 extends from the front end of the retaining frame part 97 towards the front side.

The retaining frame part 97 is shaped as a tube with a rectangular cross-section. The rotational tube part 82 of the rotational shaft 52 can be stored inside the retention frame part 97.

The side plate 99*a* is one of the four side plates 99 included in the retaining frame part 97. A slit 100 is formed on the side plate 99*a* so that the insertion convex part 54 of the supporting body 51 can be inserted in the slit 100 along the longitudinal direction.

The connection tube part 96 is shaped approximately as a cylinder. The guiding tube part 81 of the rotational shaft 52 can be inserted in the connection tube part 96.

A fitting click 96*a* is formed on the outer surface of the connection tube part 96. The fitting click 96*a* fits with the engaging opening part 18*a* formed on the outer tube body 18.

Figure 17:
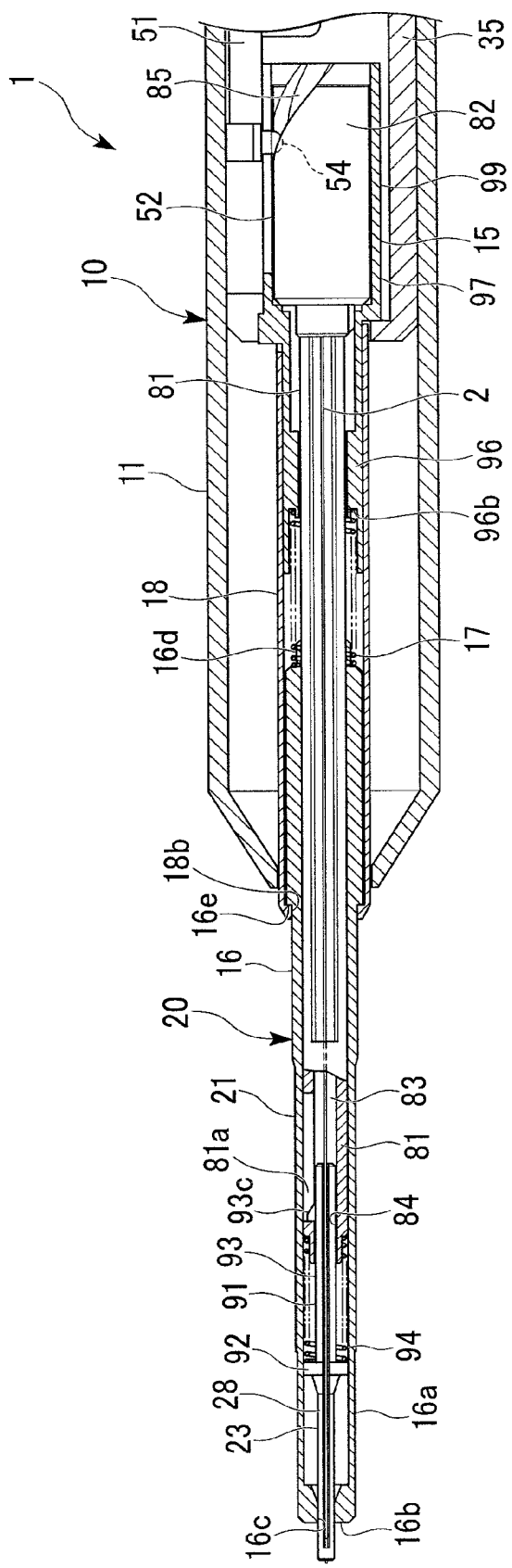
FIG. 17 is a descriptive view representing a movement of a head part according to the above embodiment.

As shown in FIG. 17, a step part 96*b* is formed in the inner surface of the connection tube part 96. The rear end of the tube urging member 17 contacts the step part 96*b*.

As shown in FIGS. 2 and 3, the tip tube part 16 includes a tube wall part 16*a* and a tip wall part 16*b*. The tip wall part 16*b* is provided on the front end of the tube wall part 16*a*.

An insertion opening 16*c* is formed on the tip wall part 16*b*. The tip extension part 28 of the head 23 is inserted in the insertion opening 16*c*. In the diagrammed example, the insertion opening 16*c* is shaped like a circle in accordance with the cross-dimensional shape of the cylindrical tip extending part 28.

In the rear end portion of the tip tube part 16, a rear end tube part 16*d* is formed so as to protrude towards the rear side. The rear end tube part 16*d* is inserted in the tube urging member 17. Thus, the position of the tip tube part 16 is determined with respect to the tube urging member 17 by this rear end tube part 16*d* (see FIG. 6).

The tip tube part 16 can move in the direction in which the tip tube part 16 is extended (towards the tip portion). The tip tube part 16 can also move in the opposite direction.

As shown in FIG. 5 with an arrow, the tip tube part 16 can rotate around the axis with respect to the tube urging member 17 and the outer tube body 18.

A spring member such as a coil spring is preferably used as the tube urging member 17. The rear portion of the tube urging member 17 is inserted in the connection tube part 96. The rear end portion of the tube urging member 17 can come in contact with the step part 96*b*. The front end portion of the tube urging member 17 can come in contact with the rear end portion of the tip tube part 16 (see FIGS. 17, 18).

The outer tube body 18 is formed approximately as a cylinder. The connection tube part 96 and the tip tube part 16 can be inserted in the outer tube body 18.

As shown in FIG. 17, a stopper part 18*b* is formed on the front end part of the outer tube body 18. The stopper part 18*b* is a convex part protruding inwards. The stopper part 18*b* contacts the step part 16*e* of the tip tube part 16. In this way, the stopper part 18*b* can restrict the tip tube part 16 from moving towards the front. The stopper part 18*b* exemplified in the figure is a convex part in the form of a band.

As shown in FIGS. 5 and 6, the tube body base part 15 includes a retention frame part 97 and a connection tube part 96. The connection tube part 96 is cylindrical and extends from the front end of the retention frame part 97 towards the front.

A fitting click 96a is formed on the outer surface of the connection tube part 96. The fitting click 96a fits with the engaging opening part 18a formed on the outer tube body 18.

As shown in FIG. 1, the extending part 20 can move in the front-rear direction (the direction in which the extending part 20 elongates and contracts) with respect to the case body 11.

According to FIG. 1, the extending part 20 is located somewhat towards the rear side. However, it is also possible to place the extending part 20 towards the front.

Although not diagramed, the extending part 20 can be inserted in the connector storing hole of the optical connector adapter. In this way, the connecting terminal surface of the ferrule inside the connector storing hole can be cleaned.

As shown in FIG. 4, a cap 102 can be attached to a tip of the extending part 20. The cap 102 includes a guiding main body 103 and a lid 104. The guiding main body 103 is shaped like a sleeve (in the form of a tube). The lid 104 is connected to an end of the guiding main body 103 with a hinge 105.

A connector insertion opening 106 (a plug insertion opening) is formed on an end of the guiding main body 103 at the side of the lid 104. An optical connector plug (not diagramed) is inserted in the connector insertion opening 106. The connecting terminal surface of the optical connector may be cleaned by inserting the optical connector plug into the connector insertion opening 106, and by wiping the connecting terminal surface with the cleaning body 2.

The cap 102 is connected to the case body 11 through a retaining band part 107.

Next, an example of a method of using the cleaning device 1 is described.

According to the normal condition shown in FIGS. 2 and 17, the tube urging member 17 applies a reactive force to the step part 96b of the connection tube part 96, and thus energizes the tip tube part 16 towards the front. Therefore, the tip tube part 16 is positioned somewhat in the front side. This position of the tip tube part 16 is referred to as the front position. Therefore, only a very short portion of the tip extending part 28, including the tip portion, is exposed.

Under this condition, the stopper part 18b of the outer tube body 18 contacts the step part 16e of the tip tube part 16. As a result, the tip tube part 16 is restricted from moving towards the front.

Figure 19:
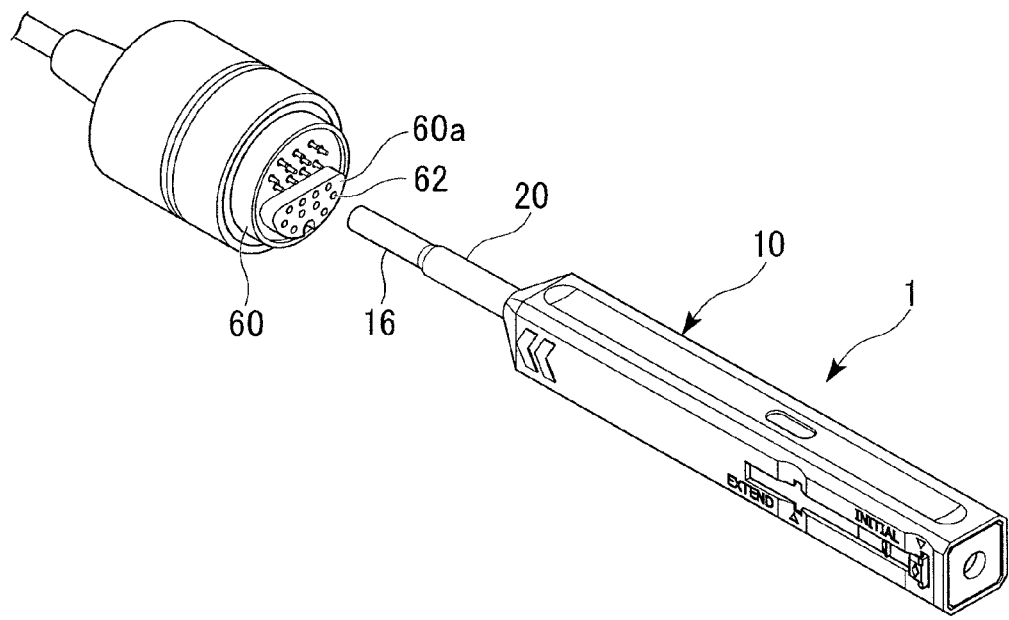
FIG. 19 is a processing diagram representing a method of using a cleaning device of an optical connector according to the above embodiment.
Figure 20:
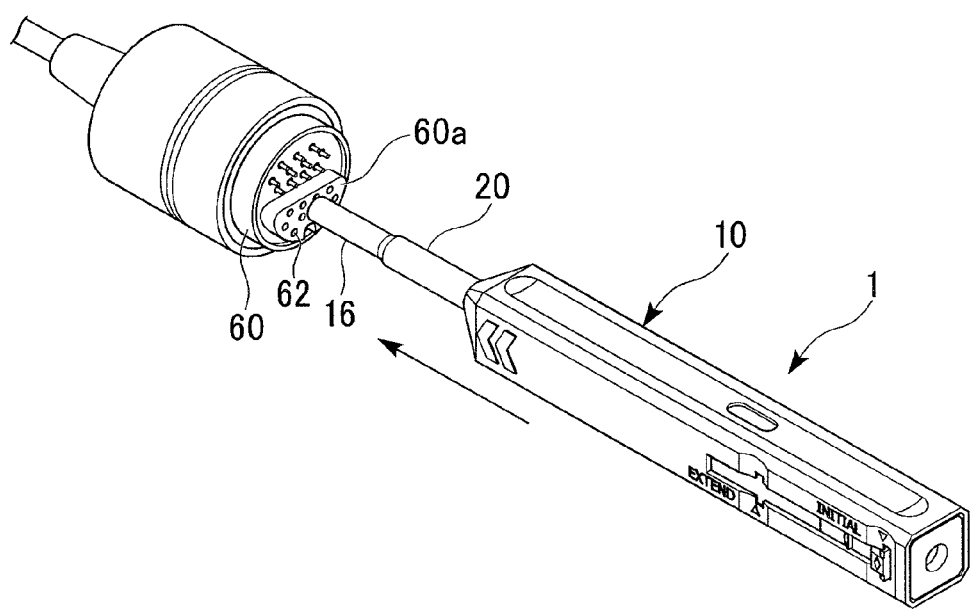
FIG. 20 is a processing diagram following FIG. 19.

As shown in FIGS. 19 and 20, the case body 11 is held. The tip tube part 16 of the extending part 20 is pressed against the terminal surface 60a of the optical connector 60.

Figure 25:
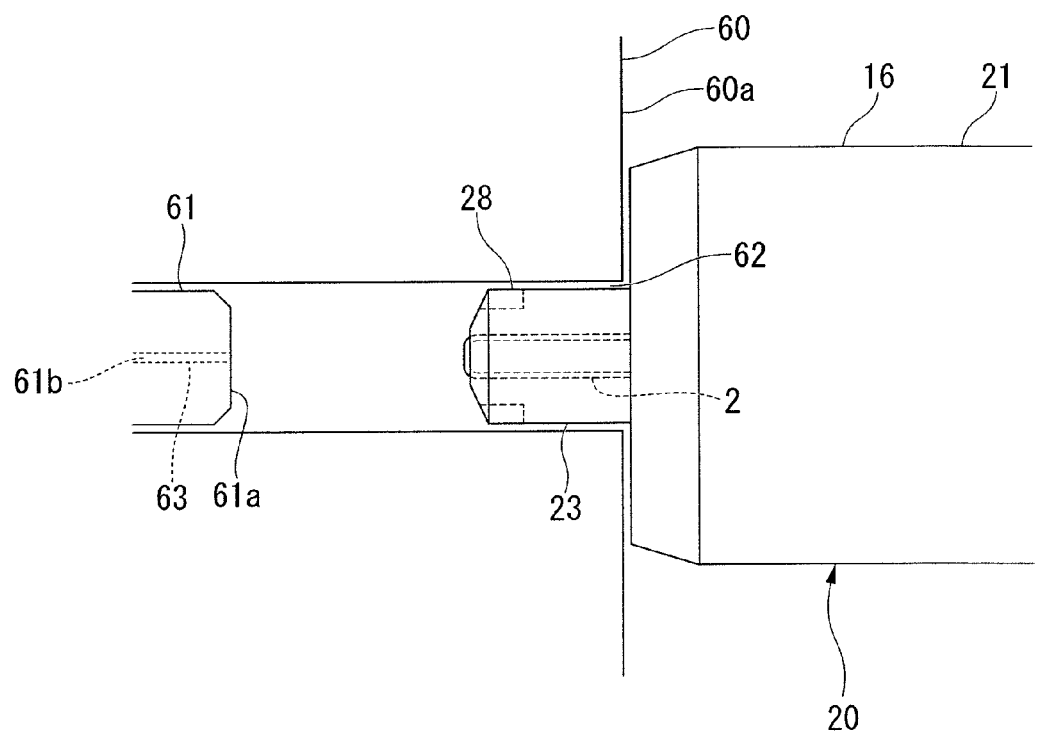
FIG. 25 is a descriptive view representing a movement of a head part according to the above embodiment.

As shown in FIG. 25, the position of the extending part 20 can be easily determined with respect to the optical connector 60 by inserting the tip extending part 28 into the insertion hole 62. The tip extending part 28 sticks out from the terminal wall part 16b.

Figure 21:
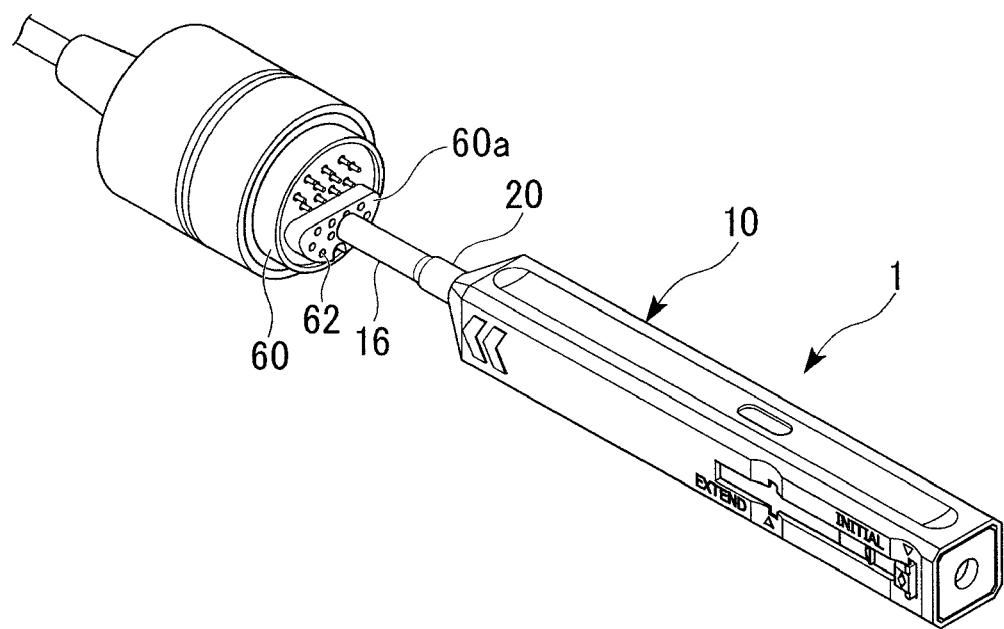
FIG. 21 is a processing diagram following FIG. 20.

As shown in FIG. 21, when the case body 11 is moved towards the front, the tip tube part 16 receives a reactive force from the terminal surface 60a of the optical connector 60. As a result, the tip tube part 16 moves relatively backwards. This position of the tip tube part is referred to as the rear position.

Figure 18:
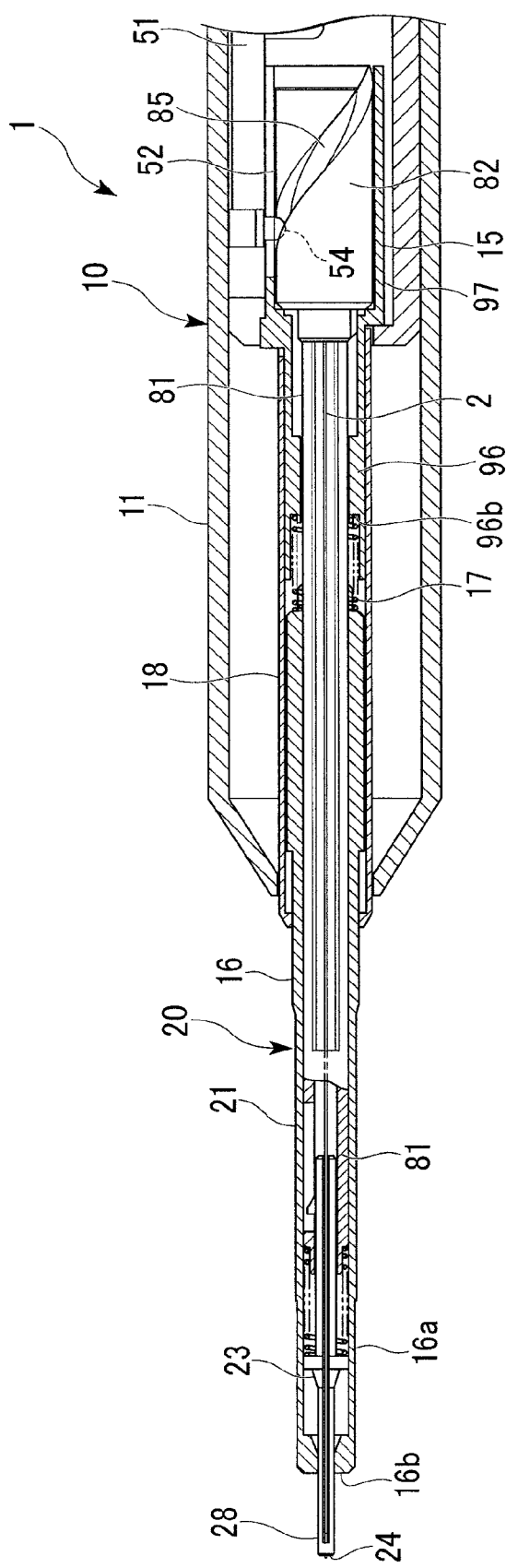
FIG. 18 is a descriptive view representing a movement of a head part according to the above embodiment.

As shown in FIGS. 3 and 18, when the tip tube part 16 is located at the rear position, a large portion of the tip extending part 28 extends from the tip tube part 16

As a result, as shown in FIG. 26, the tip extending part 28 is inserted deep inside the insertion hole 62. In addition, the cleaning body 2 on the pressing surface 24 contacts an appropriate location of the connecting terminal surface 61a of the optical plug 60 (here, referring to the optical fiber hole 61b and its vicinity).

Figure 22:
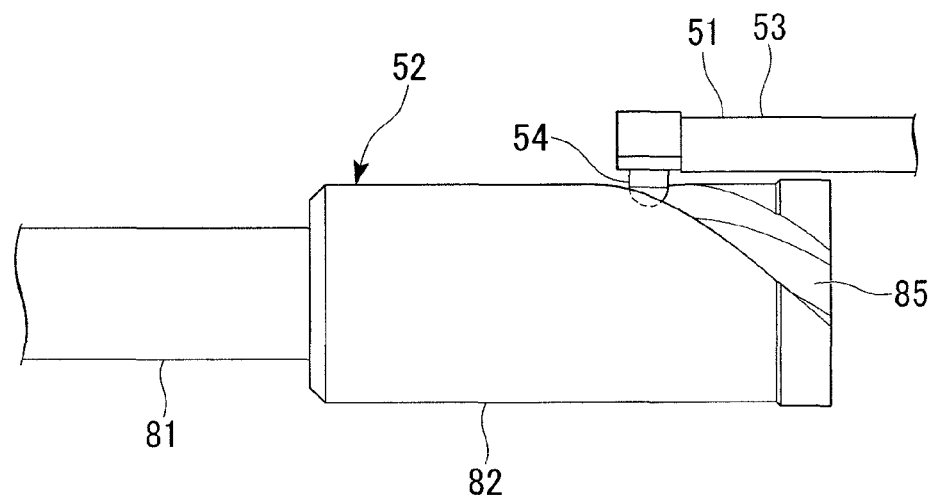
FIG. 22 is a descriptive view representing a movement of a rotational shaft according to the above embodiment.
Figure 23:
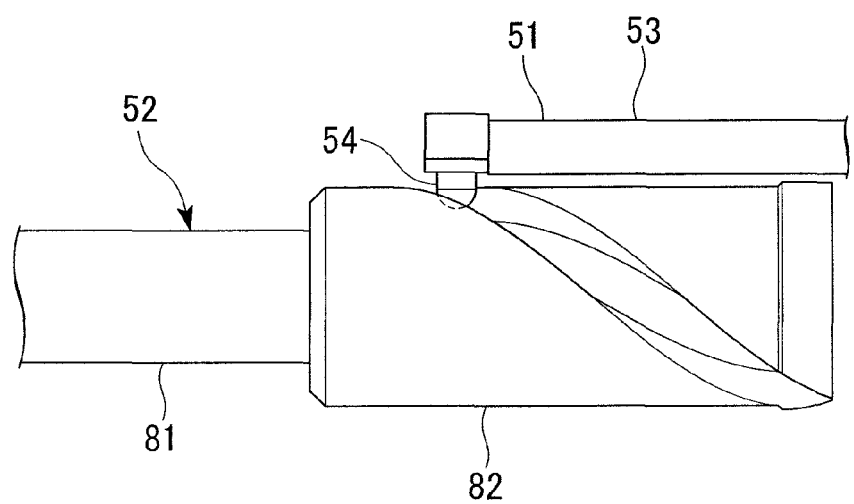
FIG. 23 is a descriptive view representing a movement of a rotational shaft according to the above embodiment.

As shown in FIGS. 22 and 23, the extending tube body 21 moves relatively towards the rear side with respect to the case body 11. Thus, the extending tube body 21 pushes the rotational shaft 52. The rotational shaft 52 then moves relatively towards the rear side with respect to the supporting body 51. As a result, the rotational tube part 82 moves towards the peripheral direction along the cam groove 85. The rotational shaft 52 then rotates around the axis.

As shown in FIG. 26, the head part 23 rotates around the axis due to the rotation of the rotational shaft 52. As a result, the cleaning body 2 rotates around the axis of the head part 23 while the cleaning body 2 is in contact with the connecting terminal surface 61a. In this way, the connecting terminal surface 61a is cleaned by being wiped by the cleaning body 2.

As shown in FIGS. 4, 7, and 16, the supporting body 51 moves relatively with respect to the feeding mechanism 3. Thus, the gear receiving part 56 applies a force to the gear wheel part 88 of the gear 38 in the rotational direction. As the gear 38 rotates, the wrapping-up reel 31 rotates as well. In this way, the cleaning body 2 is wrapped up.

At the same time, the cleaning body 2 is pulled out from the supplying reel 30 and moves through the pressing surface 24 of the head part 23.

Due to the movement of the cleaning body 2, the litter, dust, and oil attached to the connecting terminal surface 61a is wiped away and removed reliably.

When the extending part 20 is pulled out from the optical connector 60, the extending part 20 moves relatively towards the front with respect to the case body 11 due to the elastic force of the urging member 40 (i.e., in the direction in which the extending part 20 is elongated). At this time, the tip tube part 16 returns to the front position due to the elastic force of the tube urging member 17 (see FIGS. 2 and 17).

Figure 27:
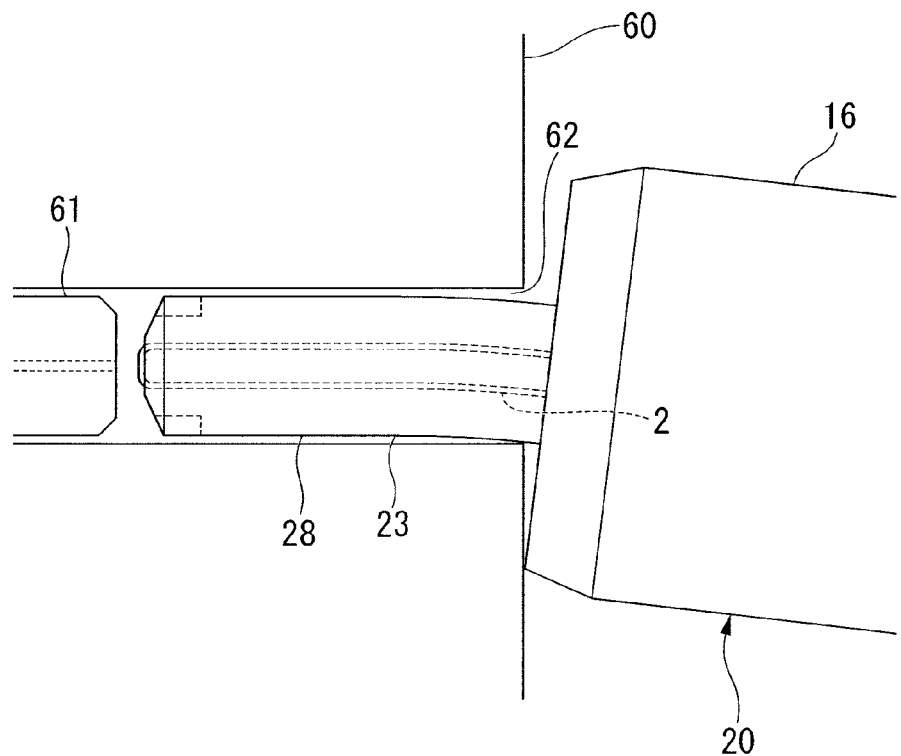
FIG. 27 is a descriptive view representing a movement of a head part according to the above embodiment.

As shown in FIG. 27, when the tip extending part 28 is inserted into or pulled out of the insertion hole 62 of the optical connector 60, the tip tube part 16 might tilt due to an operation by the cleaning personnel. Thus, a force in the bending direction may be applied to the tip extending part 28 by the optical connector 60.

However, the cleaning device 1 is configured so that the tip extending part 28 can be bent and deformed resiliently. As a result, the tip extending part 28 is prevented from breaking.

In the diagrammed example, the optical connector 60 was the object to be cleaned. However, the object to be cleaned with the cleaning device according to the present invention is not limited to this diagrammed example. The cleaning device may be used to clean, for example, an optical connector adapter and an optical connector receptacle (in particular, a receptacle housing) as well.

While a preferred embodiment of the present invention has been described above, it should be understood that these are exemplary of the invention and are not to be considered as limiting the present invention. It should be noted that additions, omissions, substitutions, and other modifications can be made without departing from the spirit or scope of the present invention. The invention is not to be considered as being limited by the foregoing description, and is only limited by the scope of the appended claims.

What is claimed is:

1. An optical connector cleaning device which cleans a connecting terminal surface formed inside an insertion hole of an optical connector, by wiping the connecting terminal surface with a cleaning body, the optical connector cleaning device comprising:

a main body comprising a feeding mechanism which supplies and wraps up the cleaning body;

an extending part which extends from the main body and includes an extending tube body and a head part, the head part being inserted into the insertion hole, wherein the head part includes a tip extending part which presses the cleaning body to the connecting terminal surface;

the extending tube body includes a tube base part and a tip tube part, the tip tube part being energized in an extending direction with respect to the tube base part due to an urging member;

the tip extending part protrudes from a tip of the tip tube part, and a protruding length of the tip extending part is adjusted by the tip tube part moving with respect to the tube base part towards the extending direction and towards a direction opposite to the extending direction; and the tip extending part is flexible.

2. An optical connector cleaning device according to claim 1, wherein the head part includes polyoxymethylene.

3. An optical connector cleaning device according to claim 1, wherein the head part protrudes from the tip of the tip tube part in a normal state.

4. An optical connector cleaning device according to claim 2, wherein the head part protrudes from the tip of the tip tube part in a normal state.

* * * * *